United States Patent [19]

Sanghera et al.

[11] Patent Number: 5,294,240
[45] Date of Patent: Mar. 15, 1994

[54] METHOD OF FORMING WAVEGUIDES WITH ION EXCHANGE OF HALOGEN IONS

[75] Inventors: Jasbinder S. Sanghera, Greenbelt, Md.; Pablo C. Pureza, Burke; Ishwar D. Aggarwal, Fairfax Station, both of Va.

[73] Assignee: The United States of America as represented by the Secretary of the Navy, Washington, D.C.

[21] Appl. No.: 937,765

[22] Filed: Sep. 1, 1992

[51] Int. Cl.$^5$ ............................................. C03C 21/00
[52] U.S. Cl. .................................. 65/3.14; 65/30.13; 65/DIG. 15; 65/DIG. 16
[58] Field of Search ................ 65/DIG. 15, DIG. 16, 65/30.13, 3.15, 3.11, 2, 30.1, 3.14

[56] References Cited

U.S. PATENT DOCUMENTS

| | | | |
|---|---|---|---|
| 4,181,403 | 1/1980 | Macedo | 65/3.15 |
| 4,859,222 | 8/1989 | Blauch | 65/3.15 |
| 4,923,496 | 5/1990 | Braglia | 65/30.13 |
| 5,163,987 | 11/1992 | Ishiguro | 65/DIG. 16 |

FOREIGN PATENT DOCUMENTS 156337 9/1982 Japan .............................. 65/DIG. 16

*Primary Examiner*—W. Gary Jones
*Assistant Examiner*—John Hoffmann
*Attorney, Agent, or Firm*—Thomas E. McDonnell; George A. Kap

[57] ABSTRACT

This invention pertains to optical waveguides which includes waveguides of all shapes and sizes, preforms, and optical fibers made from the preforms, and to a method for making waveguides devoid of a physical interface. The method includes preparation of a waveguide from a halide-containing glass, heating the waveguide to a temperature below crystallization temperature of the glass so that it is still solid, providing a gaseous reactive medium containing halide ions of higher electronegativity than halide ions in the waveguide, exposing the waveguide to said reactive medium for a sufficient duration for the halide ions of higher electronegativity in the reactive medium to replace at least a portion of the halide ions of lower electronegativity in the waveguide, and cooling the waveguide whereby a lower refractive index is formed on the side of the waveguide exposed to the reactive medium than the refractive index internally of the waveguide so that light can travel through the portion of the waveguide having the higher refractive index.

10 Claims, No Drawings

METHOD OF FORMING WAVEGUIDES WITH ION EXCHANGE OF HALOGEN IONS

FIELD OF INVENTION

This invention pertains to optical waveguides made from halide-containing glasses and to a method of making optical waveguides by exchanging halide ions of lower electronegativity with halide ions of higher electronegativity.

DESCRIPTION OF PRIOR ART

Optical fibers, a type of an optical waveguide, are generally made by a double crucible method or by the rod-in-tube method from halide-containing glass. The latter method is also known as the preform method and presently is considered to be the more successful one when a halide-containing glass is used.

In the double crucible method, a pair of crucibles is used in which the crucibles contain melted core glass in the upper crucible and cladding glasses in the lower crucible, with a centrally positioned port. The crucibles are positioned one above the other with the ports in registry along the vertical plane. The top crucible contains core melted glass which has a higher refractive index than the glass used to make the cladding. A core glass is extruded through the port directly into the melted cladding glass disposed in the crucible directly below the top crucible. Although the core glass issuing from the top crucible is extruded directly and centrally into the port in the lower crucible, the lower port is of a greater diameter than the upper port. The core glass has space around itself as it passes through the port in the lower crucible. As the core glass traverses through the melted cladding glass in the lower crucible, a layer of melted cladding glass is carried along therewith until the lower port is approached where the melted cladding layer around the core probe is limited to the space around the core probe while the core probe is in the lower port. The result of the double crucible method is a core of a higher refractive index glass enveloped by a cladding of a lower refractive index glass. The core and cladding glasses form an optical fiber with an interface therebetween.

Upon issuing from the port in the lower crucible, the fiber is cooled so that it assumes a more rigid fiber structure and reeled onto a spool for storage. The parameters of the method can be manipulated to produce an optical fiber of desired core diameter and desired cladding thickness. The optical fiber overall diameter, which includes only the core and the cladding, is by way of example, about 20-400 microns of which, core is 10-90%, preferably 40-60%.

Although the double crucible method has the advantage of being able to make single mode and very long length optical fibers, this method also has disadvantages. The main disadvantages of this method are the poor concentricity of core and cladding and the presence of bubbles and crystals at the physical interface of the core and the cladding.

The rod-in-tube or the preform method is based on an old established method used in other glass systems to form tubes by rotational casting. In this method, a vertically disposed mold is only partially filled with molten cladding glass and then positioned horizontally and spun at several thousand rpm until the glass cools to form a tube. A core glass, in a molten condition, is then cast in this tube in the usual way.

In the apparatus used to make optical fibers by the preform method, a small lathe is installed in the melt glove box so that casting can be done under inert conditions. The molten glass takes several tens of seconds to solidify.

After casting, the mold can be transferred to an annealing oven situated in the glove box, without coming into contact with the ambient environment. The preform, in one embodiment of this method, is kept for about one hour at an elevated temperature below $T_g$, and then the temperature is ramped down to room temperature.

Since the outer surface of the molten glass is brought into contact with a potentially contaminating metal during the casting process, several techniques have been developed to remove the outer layer to form the preform. They include mechanical polishing and chemical etching. These techniques are able to improve the fiber strength and to reduce the optical loss.

The advantage of the preform or rod in tube methods resides in the fact that it can be used to make single mode optical fibers which fibers have no bubbles in the core. The disadvantage of this method resides in that it results in optical fibers with bubbles and crystals at the physical interface between the core and cladding.

SUMMARY OF INVENTION

It is an object of this invention to make optical waveguides and method for their preparation in which waveguides have sections of different refractive indices but are devoid of bubbles and/or crystals at the junction of the sections.

It is another object of this invention to make entire optical waveguides having a gradual transition between a section of higher refractive index and a section of lower refractive index.

It is another object of this invention to make optical waveguides from the same glass material, the optical waveguides having core and cladding of higher and lower refractive indices.

It is another object of this invention to make optical preforms and method for their preparation from halide-containing glass wherein the preforms are made from the same glass material and have sections of higher and lower refractive indices, there being a gradual transition in index of refraction between sections of different refractive indices.

It is another object of this invention to replace 60-90 mol percent of halide ions in 10-60% of the outer portion of a waveguide, measured from the surface of the waveguide coming in contact with a reactive medium, the replaced halide ions in the waveguide having lower electronegativity than the replacing halide ions provided by the reactive medium.

These and other objects of this invention are realized by making an optical waveguide from a halide-containing glass containing a halide of electronegativity below that of the halide in the reactive medium by contacting the waveguide with a reactive medium containing halide ions wherein at least some of the halide ions in the waveguide are ion-exchanged with halide ions of higher electronegativity in the reactive medium.

DETAILED DESCRIPTION OF INVENTION

Optical waveguides of this invention are made from a halide-containing glass by a method that utilizes an ion exchange of halide ions. The ion exchange occurs by a replacement of an ion of lower electronegativity by an ion of higher electronegativity. The method described herein is characterized by the step of contacting a halide-containing glass with a reactive medium containing at least one halide ion of higher electronegativity than that in the glass. The halide ions in the reactive medium are ions exchanged with the halide ions in the glass thereby producing a glass having an outer portion of lower refractive index and an inner portion of higher refractive index.

As used herein, the term "optical waveguides" includes optical waveguides of any shape or form, optical fibers, optical preforms from which optical fibers are made, and bulk optical components which are characterized by a difference in refractive indices in areas for conducting light as opposed to lesser conducting areas of lower refractive indices. Electronegativity of halides in decreasing order is $F > Cl > Br > I$.

The novel fabrication of halide-containing glass optical waveguide structures is accomplished in a single operation without casting of core and/or cladding glasses. Therefore, the new optical waveguides posses no interfacial crystals and/or bubbles and hence lower optical scattering loss than optical waveguides prepared by conventional techniques.

As used herein, the term "outer" portion of a waveguide refers to the portion of a waveguide where the refractive index is altered by a ion exchange based on the difference of electronegativity between the replaced and replacing halide ions. In a composite optical fiber, the inner portion corresponds to the core. It is the portion with no or an insignificant amount of the halide ions from the reactive medium. The outer portion corresponds to the cladding of a composite optical fiber and is the portion which comes in contact with the reactive medium. It is characterized by an effective amount of the halide ions from the reactive medium. The core or the inner portion thus has a higher refractive index than the cladding or the outer portion. In a planar waveguide, the outer portion refers to the portion which comes in contact with the reactive medium and which has a lower refractive index than the inner portion. Refractive index, as used herein, means an average refractive index measured over the entire inner or outer portions.

The optical waveguides of this invention are prepared from halide-containing glass by initially forming a glass article having form and dimensions dependent on its ultimate application. The halide-containing glass must contain a halide of electronegativity that is lower than that of the halide in the reactive medium so that it can be ion exchanged with a halide of higher electronegativity in the reactive medium. To facilitate ion exchange, the glass articles from which optical waveguides of this invention are made are subjected to a reactive medium atmosphere containing a halide of a higher electronegativity than the halide in the article. Under the influence of the reactive atmosphere and at appropriate temperature, pressure and time, ion exchange takes place whereby a halide ion of lower electronegativity in the glass article is replaced with a halide ion of higher electronegativity in the reaction medium. Ion exchange can take place in an open system or a closed system. In an open system, the reactive medium, preferably in the form of a gas, can flow over and around the glass article whereas in a closed system, a certain amount of reactive medium is injected into a chamber where the glass article is disposed and ion exchange takes place with the stationary reactive medium.

In carrying out the novel method disclosed herein, the glass is heated to and beyond its glass transition temperature but below its crystallization temperature so that the glass may be softened yet it is sufficiently solid to maintain its shape. It is necessary to maintain the shape of the glass without melting it because it is desirable to have a gradual transition of refractive index in response to ion exchange taking place. Although at the outer portions of the glass, ion exchange will take place readily, ion exchange internally will depend on diffusion of the halide ions of higher electronegativity index from the reactive medium through the glass. Diffusion will depend on parameters such as temperature of the halide ions initially in the glass article, pressure of the reactive medium, concentration of the reactive medium, flow rate of the reactive medium, and the like.

Since glass transition temperature (Tg) and crystallization temperature (Tx) of a glass depend on composition of the glass, it is not possible to give specific figures therefor. Glass transition temperatures and crystallization temperatures for the various halide-containing glasses can be obtained from reference books. Generally, for the halide-containing glasses Tg will be in the range of about 200°–400° C. and Tg will be about 100° C. lower than Tx in the more stable glasses. Suffice it to say that in carrying the method of this invention, the glass article should be heated above its glass transition temperature but below its crystallization temperature. The higher the temperature the quicker will be the ion exchange between the reactive medium and the glass article. Generally, melting is not a concern since the melting temperature is usually several hundred degrees or well above the glass transition or crystallization temperatures. Ion exchange can take place below the glass transition temperature, however, the duration of ion exchange will be increased, which is undesirable.

Heating the glass article should be below crystallization temperature of the glass in order to avoid crystallization in the glass article. Glass is amorphous and presence of crystals therein will distort transparency thereof. Generally, crystallization temperature is substantially higher than glass transition temperature of a glass and for this reason, no difficulty is encountered in heating a glass article to an appropriate temperature for ion exchange to take place.

Duration of ion exchange should be kept as short as possible. Manipulation of certain parameters can reduce ion exchange duration substantially. For purposes herein, duration of ion exchange should be in the approximate range of 0.1–48 hours, preferably 0.25–24 hours, and more preferably 0.5–5 hours.

The reactive medium should preferably be a gas. Concentration of the reactive medium in the atmosphere around the glass article is 1% to 100%, preferably 50% to 100%, by volume, and the reactive medium pressure is sub-atmospheric to super atmospheric, preferably 1 atm to 10 atm. In a closed system, the flow rate of the reactive medium will, of course, be about zero since it will be more or less stationary, however, in an open system, where ion exchange takes place continuously between the glass article and the flowing reactive medium, flow rate of the reactive medium will depend on how much ion exchange is desired and on many other parameters. However, based on practical considerations, in an open or continuous system, flow rate of the reactive medium should be 0.002 ft³/hr to 1 ft³/hr, preferably 0.002 to 0.3 ft³/hr at standard conditions, based on a reaction chamber of 8 ft³×2 ft ×2 ft) to accommodate fluoride fibers and large fluoride bulk optics.

As was already mentioned, the glass from which the glass article is made can be any suitable halide containing glass. Preferred, of course, are the ultra low loss glasses which have been developed and which are being developed because of their extremely low potential optical losses. Principal example of such glasses are the halide glasses which are also referred to as heavy metal glasses or heavy metal halide glasses or multicomponent metal halide glasses.

Halide glasses are well known as composition per se and for use in making optical waveguides. These glasses are amorphous mixtures of halides of metals and most of the metallic halides have been reported as constituents. For making of optical fibers, the elements Ba, La, Al, Na, Li, Pb, and especially Zr and/or Hf have proved to be particularly suitable. The halide component of the glass is almost always fluorine but chlorine has also been used, usually as fluoride/chloride mixtures. For instance, halide glasses can comprise 80-90 mol percent of salts selected from zirconium fluoride, hafnium fluoride, barium fluoride, lanthanum fluoride, aluminum fluoride, indium fluoride, lithium fluoride, sodium fluoride, lead fluoride, yttrium fluoride, and mixtures thereof. Such glasses contain 0.1-10, preferably 2-7 mol percent of another halide salt, such as sodium chloride, wherein the halide has lower electronegativity than the halide in the reactive medium.

In a typical halide glass, zirconium tetrafluoride ($ZrF_4$) is the network progenitor which is normally used in excess of about 50 mole percent, preferably 50 to 70%. It does not form glass by itself. Hafnium tetrafluoride ($HfF_4$) can be used to at least partially replace $ZrF_4$ to reduce refractive index. The network modifiers are $BaF_2$ and NaF which function to break bonds in a glass and thus permit modification thereof. The network intermediates which aid in building the glass structure are $LaF_2$ and $AlF_3$. To increase refractive index of a glass, variation of stoichiometry or an appropriate metal halide or $PbF_2$ can be used. Examples of suitable metal halides include sodium chloride, sodium bromide, and sodium iodide but need not be limited to these examples.

The major fluoride glass systems include fluorozirconates, fluorohafnates, fluoroaluminates, and fluoroindates doped with a halide salt selected from chloride, bromide and iodide salts. The ZBLAN glasses, denoting the first letter of the cations in the composition are particularly suitable herein for making optical waveguides. An example of such a glass is ZBLAN having the following mol percent composition: 53.0 $ZrF_4$, 20.0 $BaF_2$, 4.0 $LaF_2$, 3.0 $AlF_3$, and 20.0 NaF which, on weight basis is believed to be as follows: 18.68 g $ZrF_4$, 7.40 g $BaF_2$, 1.65 g $LaF_3$, 0.53 g $AlF_3$, and 1.74 g NaF. Other halide glasses are known in mol percent comprising as cations 20-45% Al ion, 0.5-25% Zr ion and/or Hf ion, and at least one anion selected from 0-42% Ca, 0-25% Sr, 0-25% Ba, where the total of Ca ion, Sr ion, and Ba ion is 20-70%.

Other glass systems not based on zirconium tetrafluoride or hafnium tetrafluoride include BIZYT glasses which contain the ions of Ba, I, Zn, Yb, and Th; CLAP glasses which contain the ions of Cd, Li, Al, and Pb; and AZYLMCSBN glasses which contain the ions Al, Zr, Y, La, Mg, Ca, Sr, Ba, and Na.

Chalcogenide glasses contain sulfur (S), selenium (Se), or tellurium (Te) associated with arsenic (As), germanium (Ge), or antimony (Sb). Although halide glasses and chalcogenide glasses have received a great deal of interest as potential candidates for materials transmitting in the mid-infrared region, the relatively poor chemical durability of halide glasses together with their low glass transition temperatures, especially for non-fluoride halide glasses, pose serious problems for practical application. Chalcogenide glasses, on the other hand, are well known for their high chemical durability and infrared transmittance but their relatively high refractive indices give rise to large intrinsic losses in the mid-infrared region. Another family of infrared transmitting glasses are prepared from mixtures of halides and chalcogenides and are referred to as chalcohalides which have some beneficial characteristics of both glasses.

The structural aspect of chalcohalide glasses is interesting from a fundamental viewpoint since chalcogenide glasses are predominantly covalent and halide glasses are predominantly ionic in character.

Although halide glasses and chalcohalide glasses are the most important classes of glasses for purposes herein, the invention herein can use any halide-containing glass wherein the halide can be ion exchanged for another halide of higher electronegativity. This includes metal halide glasses, such as zinc chloride ($ZnCl_2$) and silver chloride ($AgCl_2$) glasses binary glasses, such as tellurium dichloride ($TeCl_2$) and tellurium sesquichloride ($Te_3Cl_2$). The binary Te-Cl system can be extended to include sulfur (S) and systematic replacement of chlorine by bromine and iodine yields ternary glasses.

The halide-containing glass compositions to which this invention pertains covers a wide range of compositions. The compositions may contain only an amount of halide effective for the practice of this invention. The amount can be as low as 0.1 mol percent of the total glass composition. Generally, it is from about 0.1 to 10 mol percent and preferably from 1 to 5 mol percent. If the fluoride glass contains any other halide with an electronegativity lower in an effective amount, the glass can be treated by the method of this invention.

Knowing the amount of the halide ion to be replaced and diffusion coefficient of the halide ion, the refractive index after the ion exchange can be calculated. It should be remembered that refractive index of the ion exchanged portion of the optical waveguide will have a substantial change, being lowest on the outside and increasing towards the center of the waveguide Whatever halide-containing glass is used to make optical waveguides of this invention, the glass should contain halide ions which have electronegativity that is less than the electronegativity of the halide ions in the reaction medium. If the halide ions in the reaction medium are fluoride ions, this means that the halide ions in the glass can be ion exchanged with chloride, bromide, iodide, or a mixture of such ions. If sodium chloride salt is used in the halide-containing glass composition to provide the chloride ions which will be ion exchanged by the fluoride ions in the reactive medium, amount of sodium chloride, or equivalent salt, for purposes herein, in the glass composition will depend on many factors, including temperature to which the glass composition is heated in order to facilitate ion exchange, the refractive index that is desired at the outer portion of the waveguide after ion exchange, duration of ion exchange, the reactive medium used, and many other factors. Generally speaking, amount of halogen exchange is in the approximate range of 0.1-10, preferably 1-5 mole percent of the total glass composition. Less than 0.1 mole percent of such halogen compound will have an insufficient effect on the refractive index of the halide-containing glass whereas more than 10 mole percent of the halogen compound is more than enough to adequately reduce refractive index to what corresponds to a cladding in a waveguide.

The reactive medium of this invention contains a halide ion having higher electronegativity than the halide ion to be replaced in the glass article. Although hydrogen fluoride (HF) gas is the preferred reactive medium, any other halogen-containing medium, preferably gas, can be used. Examples of suitable gases includes fluorine ($F_2$), chlorine ($Cl_2$), bromine ($Br_2$), hydrogen fluoride (HF), hydrogen chloride (HCl), and hydrogen bromide (HBr) gases. In the case of a glass article composed of mixtures of halides, the reactive medium can be any halide of greater electronegativity than the halide to be replaced in that glass article. The principle here is replacement of a halide of lower electronegativity with a halide of higher electronegativity, regardless of how many halides there are in the reactive medium or the glass article.

As already noted, electronegativity of halides in decreasing order is as follows:

$$F > Cl > Br > I$$

The chloride ions are displaced by fluoride ion, as shown in equation (1) below, where M-Cl and M-F represent the chloride and fluoride ions in the glass article and HF is the gas in the reactive medium:

$$M-Cl + HF \rightarrow M-F + HCl \quad (1)$$

Hydrogen chloride (HCl) in equation (1) leaves as a gas. Thermodynamically, displacement of chloride ions by fluoride ions is highly favorable, as demonstrated by the following standard redox potentials ($E^0$):

|  | $E^0$ (volts) |
| --- | --- |
| $F_2 + 2e^- \rightarrow 2F^-$ | +2.100 (2) |
| $-\ Cl_2 + 2e^- \rightarrow 2Cl^-$ | +1.358 (3) |
| $F_2 + 2Cl^- \rightarrow 2F^- + Cl_2$ | +0.742 (4) |

By subtracting equation (3) from (2), it is seen that the formation of fluoride ions is favorable, based on the positive sign of the electrode potential in equation (4). If HF is used as the reactive medium, the products will be fluoride ions and HCl. Since HCl is a gaseous product, it will leave the surface of the glass.

If ZBLANCl is used to make the initial glass article, it will have a refractive index of 1.51 and ZBLAN glass, without NaCl, has a refractive index of 1.50. Therefore, as chloride ions in the glass article are replaced by fluoride ions from the reactive medium, the refractive index will decrease. This means that the outside surface of the glass article which was in contact with HF gas will possess a lower refractive index than the bulk of the glass article due to the depletion of chloride ions. The index profile, i.e., the reaction depth, can be controlled by the processing conditions but it is a gradient, which uniformly increases from the outer edge of the waveguide or the glass article.

The most successful present commercial techniques have used anhydrous materials as precursors for melting glasses. Probably the major consideration in the preparation of these precursors is the elimination of components which may cause extrinsic loss in the resultant product. It is evident to those skilled in the art that concentrations of some impurities, such as transition metal ions, in the raw materials need to be on the order of 1 ppb if low loss targets are to be met. Of all the manufacturing processes, material production has perhaps the most immediate effect on the final product, and in particular, optical fibers.

In making optical waveguides of the present invention, glass components are initially stored, weighed, and annealed in a special facility under an inert environment. Until they are annealed, optical waveguide are not allowed to come in contact with air.

Optical waveguides, including planar waveguides, can be made pursuant to the invention disclosed herein. Preparation of such waveguides is characterized by making a glass article in a single step generally having uniform composition throughout the article. The shape or form of such an article corresponds to the shape or form of the final or product optical waveguide. The glass article contains halide ions of lower electronegativity than the replacing halide ions from the reactive medium. The glass article is heated to below its crystallization temperature so that it retains its shape and does not become molten in an atmosphere containing the reactive medium. After remaining in the atmosphere for a sufficient duration for ion exchange to take place, whereby halide ions from the reactive medium in the atmosphere replace at least a portion of the halide ions in the glass article, the ion exchanged glass article is cooled and then removed from the atmosphere.

Since ion exchange in this situation depends on diffusion of the halide ions from the reactive medium into the heated but substantially solid glass article, a gradient is formed whereby more halide ions from the reactive medium replace the halide ions in the glass article at the outer surface than inwardly, with the result that ion exchange diminishes towards the center of the glass article. Since electronegativity of halide ions is inversely proportional to the atomic weight or size of the ions and refractive index, i.e. polarizability, is proportional to ion size, the replacing halide ions have higher electronegativity and lower refractive index. This is in agreement with the desire to have a lower refractive index towards the outer portion of the optical waveguide and a higher refractive index towards the center thereof since light propagation takes place through the glass article portion having the higher refractive index.

The optical waveguide can be in any shape desired and any portion thereof can be blocked to prevent ion exchange. This means that ion exchange can be controlled to give a glass article having the desired refractive index at the desired portion thereof. If the waveguide is rectangular in cross-section, ion exchange can be controlled to treat any surface desired, or any portion thereof. With this possible, optical planar waveguides can be made having only one or more than one surface, or any portion thereof, exposed to ion exchange with the result that the portion of the waveguide measured from the ion exchanged surface have a gradient refractive index that is lower than the refractive index of the untreated, inner portion of the waveguide.

If the reactive medium is composed of halide ions that are of lower electronegativity than the halide ions in the glass article, then ion exchange will not be favorable, assuming that the reactive medium is gaseous. If reactive medium is solid or liquid, reverse ion exchange can take place especially if the reactive medium is solid and it is in contact with the glass article.

EXAMPLE

In a specific example, a glass piece was used which was a fluoro-chloro-zirconate glass called ZBLANCl (in which the first letter of the metal is used) having the composition, in mole percent, of 53 $ZrF_4$- 20 $BaF_2$- 4 $LaF_3$- 3 $AlF_3$- 16 NaF, and also containing 4 mol percent NaCl. This glass had a melting temperature of about 850° C., glass transition temperature of about 250° C., and crystallization temperature of about 350° C. About 2 grams of this glass and 13.6 grams of HF gas, reactive medium, were placed in a Ni- containing alloy (monel) pressure bomb, heated to 288° C., and kept in the bomb for 24 hours. The temperature of 288° C. is between the glass transition temperature and the crystallization temperature of the glass. At 288° C., pressure in the pressure bomb was about 2 atmospheres. Before using it, HF was maintained as a solid at cryogenic conditions at room temperature and was weighed out in the amount indicated.

After processing or ion exchange over a period of 24 hours, the glass piece was removed from the pressure bomb and cooled to room temperature. After processing, the glass was no longer homogeneous but had a refractive index which varied across the glass cross-section. The reason for this lies in the displacement of the chloride ions in the glass piece by the fluoride ions in the HF gaseous reactive medium. This displacement was greatest at the surface and declined towards the center of the glass piece, as demonstrated below:

| Dist. from surface | mol % Cl left |
|---|---|
| 11.5 microns | 0.8 |
| 77 microns | 3.3 |
| 2000 microns (center of glass) | 4 |

The data given above demonstrates that at a distance of 11.5 microns from the surface, only 0.8 mol percent of the chloride ions remained out of a total of 4 mol percent that was initially in the glass piece whereas at a distance of 2000 microns from the surface, ion exchange appears to have ceased since all chloride ions in the glass remained after ion exchange processing.

The above data also demonstrates that most ion exchange takes place in the portion closest to the reactive medium. Based on these results, it appears that 60–90%, on molar basis, of all ion exchange taking place, takes place in the initial 0–40%, preferably 0–20%, of the glass article, measured from the surface exposed to the reactive medium to the center of the article. As used herein, 0(zero) defines a point just inside the glass article, which is on the order of atoms within the glass article or as short as a couple of angstroms.

Ion exchange can also be applied to making preforms which are used in the drawing of optical fibers. Pursuant to the invention disclosed herein, a solid glass preform in the form of a rod measuring, for example, 10 cm in length and 1 cm in diameter, is cast from a suitable halide-containing glass containing halide ions. The glass preform is then heated to a temperature below its crystallization in the presence of a reactive medium. The reactive medium can be liquid or solid but is preferably a gas and contains halide ions of higher electronegativity than halide ions in the preform. The preform is maintained in the reactive medium for a sufficient duration following which, it is cooled.

The preform and the reactive medium can be introduced into a chamber where the preform can be heated to facilitate halide ion exchange between halide ions of higher electronegativity in the reactive medium and the halide ions of lower electronegativity in the preform. The chamber can be made of a nickel-containing alloy such as monel, inconel, and hasteloy or another material which is inert to materials coming in contact therewith at the operating temperature, particularly reactive medium such as corrosive HF gas. During ion exchange, temperature and pressure in the chamber are elevated.

Following ion exchange processing, the preform is no longer homogeneous but has refractive index that varies across its cross-section. Since halide ions of higher electronegativity were exchanged for halide ions of lower electronegativity, the refractive index is lower at the outside and higher towards the center, measured radially across the cross-section of the preform. This is the desired relationship since light travels along the path of higher refractive index. The preform so formed can be used in a drawing operation to make optical fiber from the ion exchanged or processed preform.

Preparing preforms in a single step followed by ion exchange to impart to it a smaller refractive index on the outside and a larger refractive index on the inside results in a preform which has no interfacial bubbles and/or crystals. Preforms prepared in the manner described herein do not have a physical interface between a core and a cladding because the cladding portion of a preform is formed by ion exchange. This advantage is transmitted to optical fibers made by drawing the preform since optical fibers after being drawn, retain proportional composition of the preform although the optical fibers are much thinner than preforms.

Generally speaking, optical fibers are on the order of 20 to 400 microns in diameter and can be kilometers in length whereas preforms are on the order of 1–5 cm in diameter and much less than 1 meter in length.

The use of ion exchange can be adapted to making single mode or multimode optical fibers.

The techniques used to draw halide-containing glass preforms into optical fiber are based on standard methods developed for silica fiber. The main difference is the draw furnace since much lower temperatures are generally required for halide-containing fibers than optical fibers made from silica glasses.

In drawing the preform into optical fiber, a feeder is used to lower the preform into a furnace at a constant rate. A typical speed is 3.5 mm/min. The preform is held by a collet on the end of a stainless steel rod which is gripped by the feeder. The preform is mounted inside a silica liner which is sealed at the top end around the stainless steel rod so that dry nitrogen can be flushed through the chamber. In this way, surface crystallization during reheating of the preform can be kept to a minimum.

Once the furnace reaches preset temperature, the preform is lowered into the hot zone and is held there until it softens. At this point, a small blob of glass may drop from the preform, pulling a thread of fiber with it. This fiber is attached to the winding drum and spooled onto the drum once the feeder is restarted. In general, the winding speed will determine the fiber diameter, given that the preform feed rate and temperature are constant. Consequently, a diameter monitor is used to measure the fiber diameter just below the exit from the furnace. The output from the monitor is then servo-linked to the winding drum speed controller and in this way the diameter is controlled.

Polymer coatings cured by UV light can be applied in the usual way. Essentially, epoxy acrylates can be applied in the liquid monomer form using a coating cup applicator. The coating is then cured by passing the fiber through a UV lamp, flushed with nitrogen. A concentricity monitor is used to ensure even coating thickness around the fiber. The coating can be stripped by soaking for a few minutes in methylene chloride and then peeling the softened coating from the fiber.

The method outlined above, can also be used with the aid of a DC electric field. Since these glasses are ionic conductors at elevated temperature, DC electric fields can be utilized to aid in the diffusion process.

The chemical durability of halide-containing glasses decreases with decreasing electronegativity of the halogen in the order of $F>Cl>Br>I$. Therefore, since the approach described herein involves replacing halogen of lower electronegativity with one of higher electronegativity, this effectively increases the durability of the resulting optical waveguides.

The advantage of this invention comes primarily from the fact that optical waveguides of this invention are made without a physical interface. The absence of an interface between a higher refractive index portion of the waveguide, corresponding to the core, and a lower refractive index portion, corresponding to the cladding, imparts the advantage of not having interfacial bubbles and crystals in the waveguides made in the manner disclosed herein. The prior art optical waveguide manufacturing procedures are characterized by the presence of an interface between a core and a cladding were burdened with bubbles and/or crystals at the interface of the core and the cladding which contributed greatly to the optical loss of optical waveguides made in such a manner.

Having described embodiments of the invention, it will be apparent to one skilled in this art that other embodiments incorporating the concept disclosed herein may be used. It is believed, therefore, that this invention should not be restricted to the disclosed embodiments but should be limited only by the spirit and scope of the appended claims.

What is claimed is:

1. A process for treating an article comprising chalcohalide glass containing halogen ions, said process comprising the steps of heating the article to a temperature above a glass transition temperature of the chalcohalide glass but below a crystallization temperature of the chalcohalide glass;

disposing the article in a gaseous reactive medium containing halogen ions of higher electronegativity than the halogen ions in the glass for a sufficient duration to replace at least some of the halogen ions in the glass; and cooling the article.

2. The process of claim 1 wherein the glass comprises at least one compound of an element selected from the group consisting of arsenic, germanium, antimony, and mixtures thereof.

3. A process for treating an article comprising halogen-containing glass containing glass containing halogen ions, comprising the steps of heating the article to a temperature above a glass transition temperature of the halogen-containing glass but below a crystallization temperature of the halogen-containing glass;

contacting the article with a reactive medium containing halogen ions of higher electronegativity than the halogen ions in the glass for a sufficient duration to replace at least some of the halogen ions in the glass; and cooling the article.

4. The process of claim 3 wherein said reactive medium is a gas.

5. The process of claim 4 wherein the halogen-containing glass is halogen glass containing about 50–70 mole percent zirconium fluoride.

6. The process of claim 4 wherein the halogen-containing glass is halogen glass consisting of zirconium fluoride, barium fluoride, lanthanum fluoride, aluminum fluoride, indium fluoride, lithium fluoride, sodium fluoride, lead fluoride, yttrium fluoride, and sodium chloride.

7. The process of claim 4 wherein the article is an optical preform and the process includes the additional step of drawing an optical fiber from the optical preform, the optical fiber comprising a core of a higher refractive index and a classing of a lower refractive index surrounding the core with no interfacial bubbles or crystals between the core and the classing, said cooling step taking place after the optical fiber is drawn form the optical preform.

8. The process of claim 7, wherein the reactive medium is selected from the group consisting of hydrogen fluoride, hydrogen chloride, hydrogen bromide, and mixtures thereof; and wherein the duration during which the halogen ions of lower electronegativity in the glass are replaced by the halogen ions of higher electronegativity in the reactive medium is 0.25–25 hours.

9. The process of claim 8 including the additional step of spooling the optical fiber onto a winding drum, the optical fiber is in the range of 20 to 400 microns in diameter and the optical preform is in the range of 1 to 5 centimeters in diameter.

10. The process of claim 3 wherein the article has a lower refractive index in its outer portion than its interior.

* * * * *